US012387201B2

(12) United States Patent
Kulkarni et al.

(10) Patent No.: US 12,387,201 B2
(45) Date of Patent: Aug. 12, 2025

(54) MULTI-FACTOR USER AUTHENTICATION USING BLOCKCHAIN TOKENS

(71) Applicant: Bank of America Corporation, Charlotte, NC (US)

(72) Inventors: Harish Tammaji Kulkarni, Singapore (SG); Kumudini Choyal, Tung Chung (HK); Min Cao, Singapore (SG); Nhat Minh Nguyen, Singapore (SG); Ra Uf Ridzuan Bin Ma Arof, Singapore (SG); Surendran Surendran, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 184 days.

(21) Appl. No.: 17/856,097

(22) Filed: Jul. 1, 2022

(65) Prior Publication Data
US 2024/0005312 A1 Jan. 4, 2024

(51) Int. Cl.
*G06Q 20/38* (2012.01)
(52) U.S. Cl.
CPC ..... *G06Q 20/3823* (2013.01); *G06Q 20/3827* (2013.01); *G06Q 20/389* (2013.01); *G06Q 2220/00* (2013.01)
(58) Field of Classification Search
None
See application file for complete search history.

(56) References Cited

U.S. PATENT DOCUMENTS

| 9,137,228 | B1* | 9/2015 | Newstadt | H04L 63/08 |
| 9,172,698 | B1* | 10/2015 | Evans | G06F 21/34 |
| 10,043,174 | B1* | 8/2018 | Chikkanna | G06Q 20/3676 |
| 10,148,629 | B1* | 12/2018 | Roth | H04L 63/0838 |

(Continued)

FOREIGN PATENT DOCUMENTS

| WO | WO-2012005744 A1 * | 1/2012 | ......... H04L 63/0838 |
| WO | WO-2017080755 A1 * | 5/2017 | ............. G06Q 20/12 |
| WO | WO-2022154051 A1 * | 7/2022 | ............. G06F 21/31 |

OTHER PUBLICATIONS

Schneier, Bruce "Applied Cryptography Second Edition : protocols, algorithms, and source code in C" ISBN 0-471-12845-7, pp. 34-41 (Year: 1996).*

(Continued)

*Primary Examiner* — Eduardo Castilho
(74) *Attorney, Agent, or Firm* — Banner & Witcoff, Ltd.

(57) ABSTRACT

Aspects of the disclosure relate to multi-factor user authentication for card-based payment transactions using blockchain tokens. An computing platform may receive, from a computing device, transaction details associated with a card-based payment transaction corresponding to a user, wherein the transaction details comprise a card number of a payment card. The computing platform may determine, based on the card number, a user device associated with the user. The computing platform may send, to the user device, a one-time passcode (OTP). After sending the OTP, the computing platform may receive a security key. The security key may be generated based on the sent OTP and a blockchain token hash. The computing platform may, based on the (Continued)

received security key, send, to the computing device, a message indicating whether the transaction is approved or declined.

20 Claims, 11 Drawing Sheets

(56) References Cited

U.S. PATENT DOCUMENTS

| | | | |
|---|---|---|---|
| 11,310,052 B1* | 4/2022 | Keogh | H04L 9/3239 |
| 2015/0324789 A1 | 11/2015 | Dvorak et al. | |
| 2016/0261411 A1* | 9/2016 | Yau | G06Q 20/38215 |
| 2018/0047014 A1 | 2/2018 | Maus et al. | |
| 2018/0176222 A1* | 6/2018 | Bhaskar | G06Q 20/363 |
| 2018/0219861 A1 | 8/2018 | Schultz et al. | |
| 2019/0034612 A1* | 1/2019 | Smales | G06F 21/34 |
| 2019/0044942 A1 | 2/2019 | Gordon et al. | |
| 2019/0140844 A1 | 5/2019 | Brown et al. | |
| 2020/0014528 A1 | 1/2020 | Nandakumar et al. | |
| 2020/0026834 A1 | 1/2020 | Vimadalal et al. | |
| 2020/0052899 A1 | 2/2020 | Finlow-Bates | |
| 2020/0058021 A1* | 2/2020 | Mittal | G06Q 20/3829 |
| 2020/0084018 A1* | 3/2020 | Pande | H04L 9/0844 |
| 2020/0127813 A1 | 4/2020 | Millar et al. | |
| 2020/0195437 A1 | 6/2020 | Gallagher et al. | |
| 2020/0244441 A1* | 7/2020 | Madineni | H04L 9/3239 |
| 2020/0244652 A1 | 7/2020 | Iyer et al. | |
| 2020/0279235 A1 | 9/2020 | Booth et al. | |
| 2020/0364711 A1* | 11/2020 | Sarin | G06Q 20/3672 |
| 2020/0366671 A1 | 11/2020 | Larson et al. | |
| 2021/0014064 A1 | 1/2021 | Channa et al. | |
| 2021/0105271 A1 | 4/2021 | Nitturkar et al. | |
| 2021/0133750 A1 | 5/2021 | Leddy, III | |
| 2021/0241270 A1 | 8/2021 | Raevsky et al. | |
| 2021/0256511 A1 | 8/2021 | Peacemaker et al. | |
| 2021/0314143 A1* | 10/2021 | Conner | G16Y 40/50 |
| 2021/0344502 A1 | 11/2021 | Purves | |
| 2021/0399894 A1 | 12/2021 | Gallagher et al. | |
| 2021/0409195 A1* | 12/2021 | Kim | G06Q 20/385 |
| 2022/0114245 A1 | 4/2022 | Krishan | |

OTHER PUBLICATIONS

Buccafurri et al., "Securing MQTT by Blockchain-Based OTP Authentication," Sensors (Basel), Apr. 3, 2020;20(7):2002. doi: 10.3390/s20072002. PMID: 32260049; PMCID: PMC7180730. (Year: 2020).*

M. Zhang, L. Wang and J. Yang, "A Blockchain-Based Authentication Method with One-Time Password," 2019 IEEE 38th International Performance Computing and Communications Conference (IPCCC), London, UK, 2019, pp. 1-9, doi: 10.1109/IPCCC47392.2019.8958754. (Year: 2019).*

W.-S. Park, D.-Y. Hwang and K.-H. Kim, ""A TOTP-Based Two Factor Authentication Scheme for Hyperledger Fabric Blockchain,"" 2018 Tenth International Conference on Ubiquitous and Future Networks (ICUFN), Prague, Czech Republic, 2018, pp. 817-819, doi: 10.1109/ICUFN.2018.8436784 (Year: 2018).*

Machine Translation of Foreign Patent Document WO2022154051A1 (Year: 2022).*

* cited by examiner

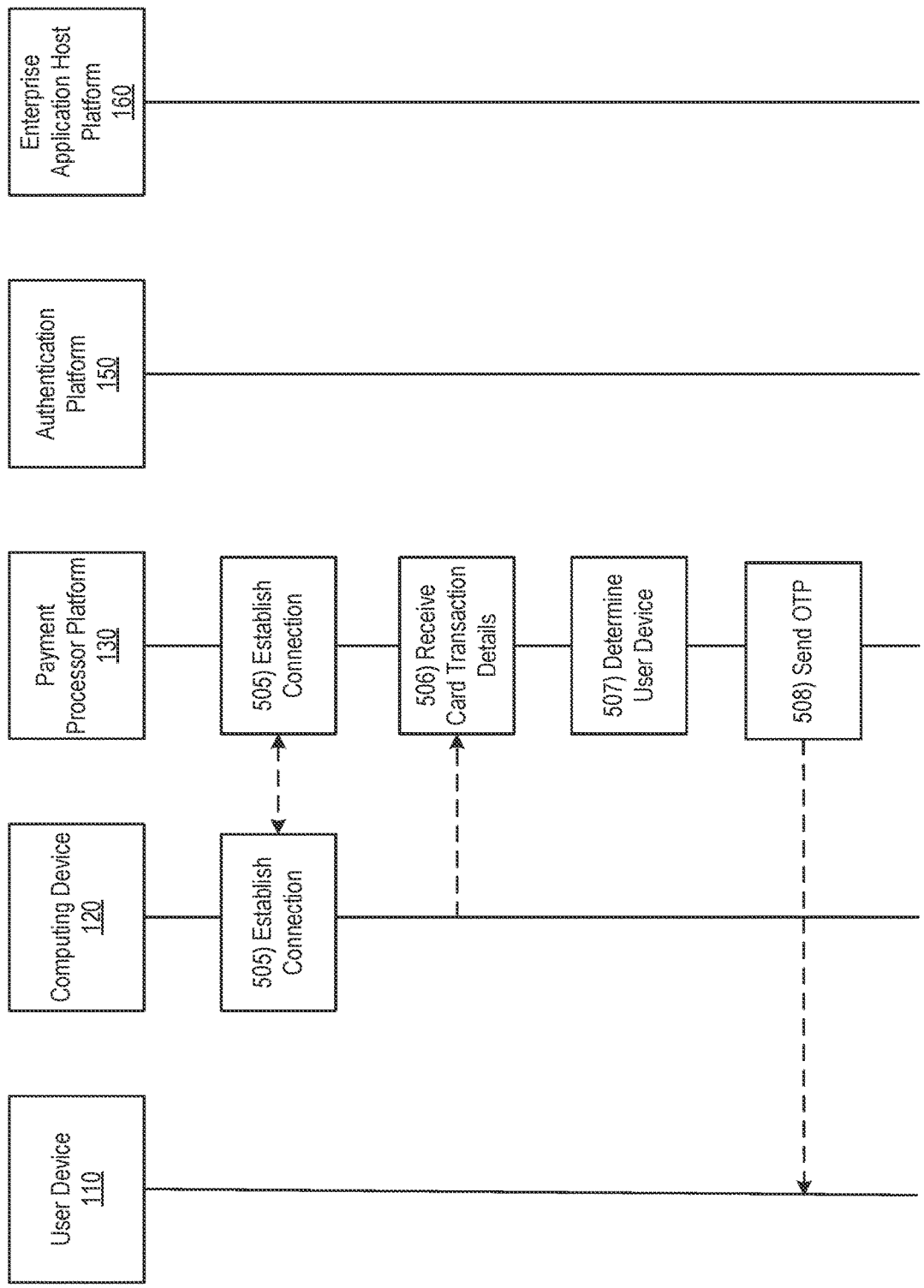

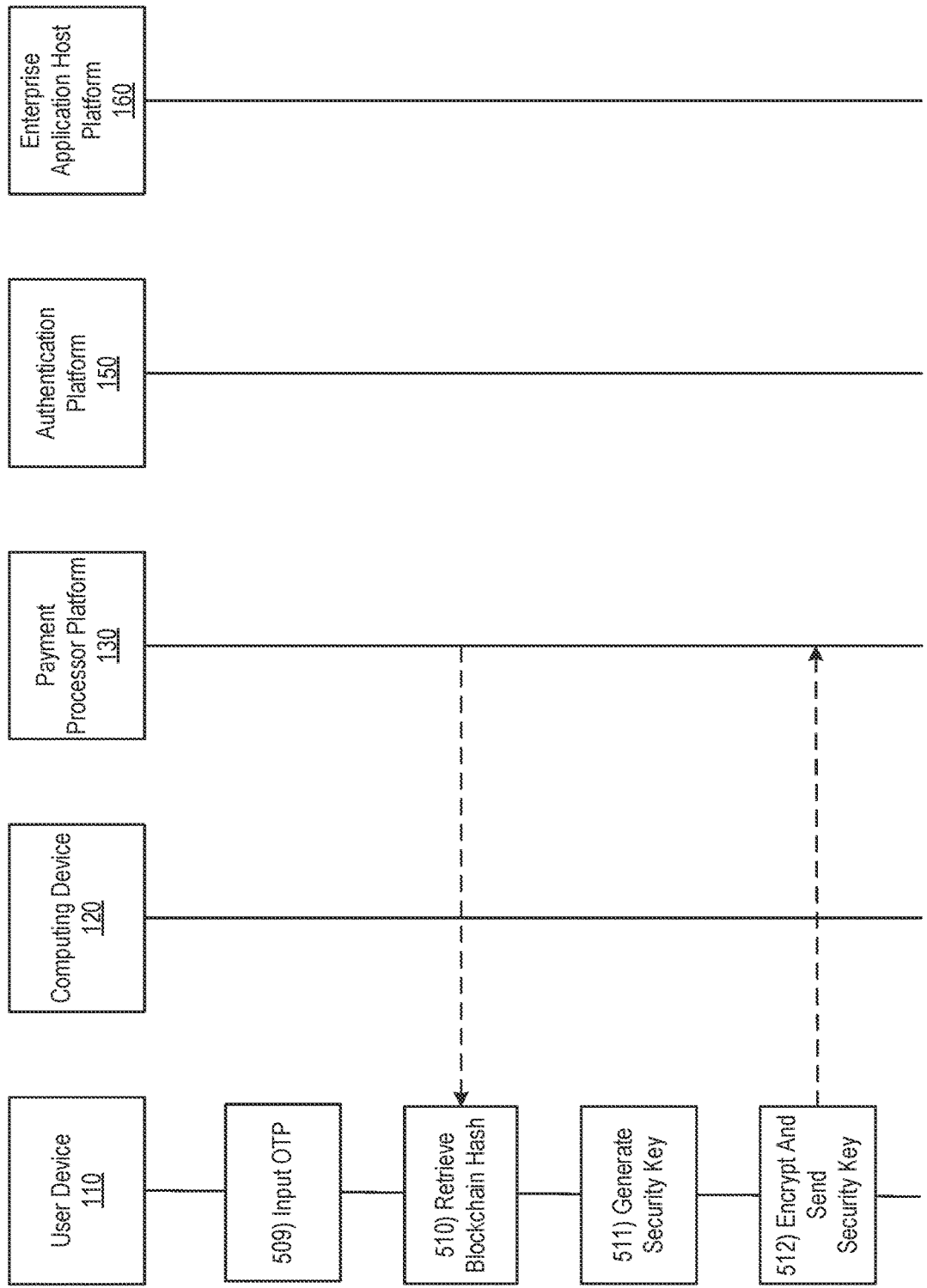

MULTI-FACTOR USER AUTHENTICATION USING BLOCKCHAIN TOKENS

BACKGROUND

Aspects described herein generally relate to the field of user security, and more specifically to multi-factor user authentication for card-based payment transactions using blockchain tokens.

Payment card-based transactions (e.g., via credit/debit card) have been ubiquitous for both offline and online transactions. To prevent unauthorized use, card issuers (e.g., banks) and payment processors have put in place security protocols that may require additional user authentication. A commonly used protocol is two-factor authentication (or more generally, multi-factor authentication) where, in addition to requiring card details (e.g., card number, card verification value (CVV) number, name, expiration date, etc.), the payment processor or a card issuing bank may require a user to validate themselves using an additional layer of authentication. For example, the payment processor or the issuing bank may send a one-time password/passcode (OTP) via a short messaging service (SMS) or an email message to the user. To complete the transaction, the user would need to input the OTP at an interface/portal to complete the transaction.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with user authentication and unauthorized activity prevention for card-based transactions. Specifically, methods, devices, and systems as described herein may use multi-factor authentication (e.g., in addition to standard OTP-based authentication, or augmented with OTP-based authentication) to ensure that card-based transactions are authenticated. In accordance with one or more embodiments, a computing platform having one or more processors, a communication interface, and memory may receive, from a computing device, transaction details associated with a card-based payment transaction corresponding to a user. The transaction details may include a card number of a payment card. The computing platform may determine, based on the card number, a user device associated with the user. The computing platform may send, to the user device, a one-time passcode (OTP). The computing platform may, after sending the OTP, receive a security key. In addition, the security key may be generated based on the sent OTP and a blockchain token hash. The computing platform may, based on the received security key, send, to the computing device, a message indicating whether the transaction is approved or declined.

In some embodiments, the blockchain token hash may be generated based on information associated with: the user, the user device, and the payment card.

In some arrangements, the computing platform may cause the user device to generate the security key based on a predefined rule set by a payment gateway device.

In some examples, the computing platform may cause the user device to generate the security key by interleaving the OTP and the blockchain token hash based on the predefined rule set by the payment gateway device.

In some embodiments, the computing platform may cause the user device to generate the security key by appending the blockchain token hash to the OTP.

In some example arrangements, the computing platform may cause the user device to generate the security key by prepending the blockchain token hash to the OTP.

In some examples, the message may indicate that the transaction is approved based on: the OTP provided in the security key matching the sent OTP, and the blockchain token hash provided in the security key matching a blockchain token hash, corresponding to the user, stored at a predetermined number of nodes associated with a plurality of card networks.

In some arrangements, the message may indicate that the transaction is declined based on one or more of: the OTP provided in the security key not matching the sent OTP; or the blockchain token hash provided in the security key not matching a blockchain token hash, corresponding to the user, stored at a predetermined number of nodes associated with a plurality of card networks.

In some embodiments, the payment card may be a credit card or a debit card.

In some examples, the user device may be a mobile communication device.

In some embodiments, receiving the security key may include receiving the security key via the user device.

BRIEF DESCRIPTION OF THE DRAWINGS

The present disclosure is illustrated by way of example and not limited in the accompanying figures in which like reference numerals indicate similar elements and in which:

FIGS. 5A-5F show an example event sequence for multi-factor authentication of a card-based transaction based on a blockchain token, in accordance with one or more example arrangements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

While multi-factor authentication systems (e.g., as described above) may provide security against unauthorized activity in most scenarios, it might not be completely secure. For example, two-factor authentication based on OTP (e.g., as may be sent via an SMS message) may be diverted to a device of an attacker, instead of a device of an authorized user. The attacker may, based on the diverted OTP, initiate an unauthorized card-based transaction.

Figure 1:
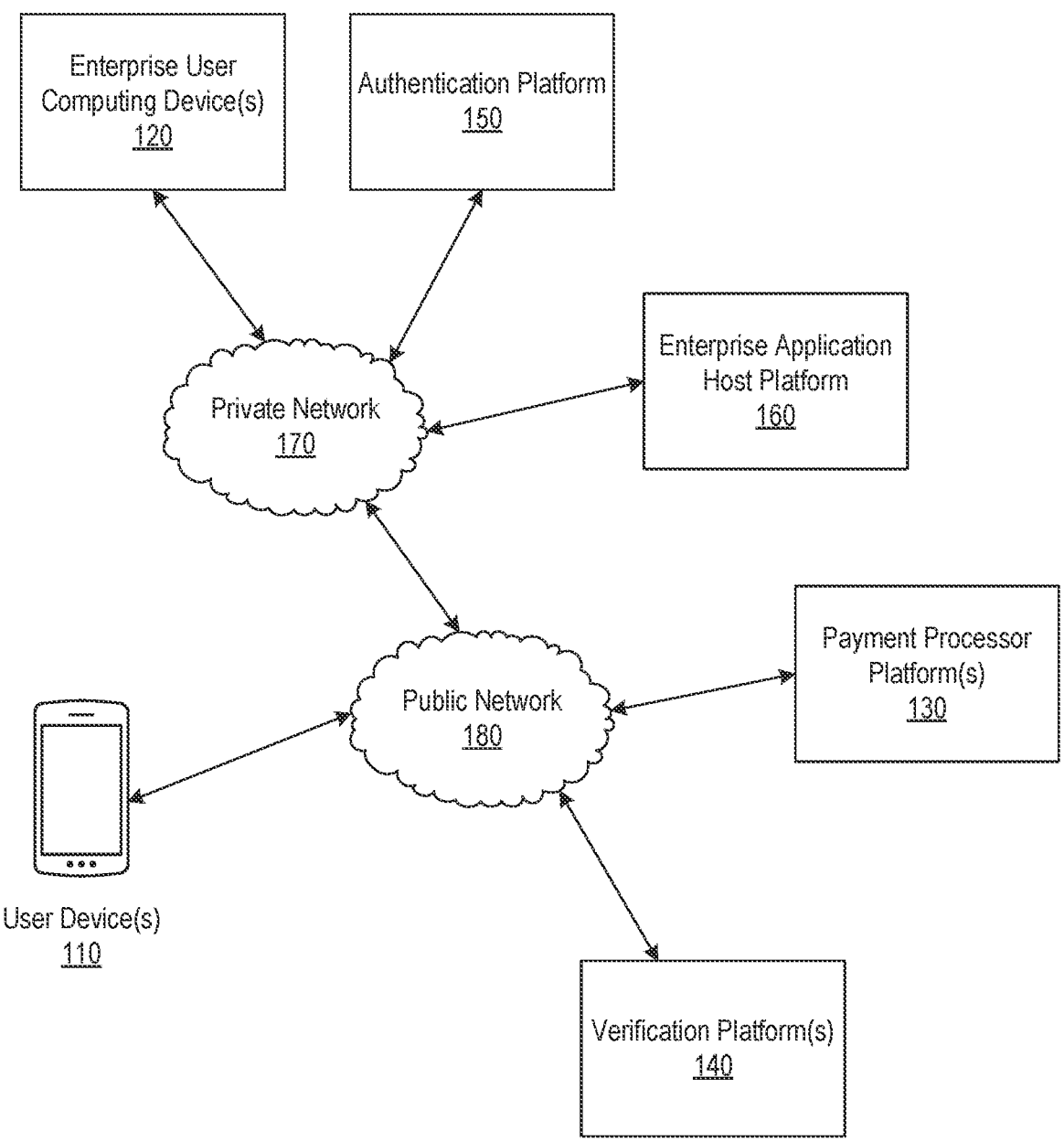
FIG. 1 shows an illustrative computing environment in which an authentication system for processing card-based transactions may be deployed, in accordance with one or more example arrangements.

FIG. 1 shows an illustrative computing environment 100 in which an authentication system for processing card-based transactions may be deployed, in accordance with one or more arrangements. The computing environment 100 may comprise one or more devices (e.g., computer systems, communication devices, and the like). The computing environment 100 may comprise, for example, an authentication platform 150, an enterprise application host platform 160, and/or one or more enterprise user computing devices 120. The one or more of the devices and/or systems, may be linked over a private network 170. In an arrangement, the private network 170 may be associated with an enterprise organization (e.g., a bank/financial institution). For example, the private network 170 may correspond to a network associated with an issuing bank of a payment card (e.g., credit card, debit card). The payment card may be issued to an authorized user for initiating transactions.

The computing environment 100 may additionally comprise one or more external devices/systems connected, via a public network 180, to the devices in the private network 170. For example, the public network 180 may comprise user device(s) 110 that may be used to initiate card-based transactions. The public network 180 may further comprise various platforms associated with a card payment infrastructure that facilitates card-based transactions. For example, the public network 180 may comprise one or more payment processor platform(s) 130 and one or more verification platform(s) 140.

The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3$^{rd}$ Generation Partnership Project (3GPP) cellular protocol, a hypertext transfer protocol (HTTP), and the like).

The authentication platform 150 may comprise one or more computing devices and/or other computer components (e.g., processors, memories, communication interfaces) configured to perform one or more functions as described herein (e.g., as described with reference to FIGS. 4-6). For example, the authentication platform 150 may comprise one or more computers (e.g., laptop computers, desktop computers, servers, server blades, or the like). As described herein, the authentication platform 150 may authenticate a user requesting a card-based payment transaction using multi-factor authentication. The authentication may be based on one or more of an OTP, a blockchain token, a hash of a blockchain token, a security key generated at a user device, etc.

The enterprise application host platform 160 may comprise one or more computing devices and/or other computer components (e.g., processors, memories, communication interfaces). In addition, the enterprise application host platform 160 may be configured to host, execute, and/or otherwise provide one or more enterprise applications. In an arrangement where the private network 170 is associated with a banking/financial organization, the enterprise application host platform 160 may be configured, for example, to host, execute, and/or otherwise provide one or more transaction processing programs, such as online banking applications, fund transfer applications, data transmission applications, and/or other programs associated with the financial institution. The enterprise application host platform 160 may comprise various servers and/or databases that store and/or otherwise maintain account information, such as financial account information including account balances, transaction history, account owner information, and/or other information. In addition, the enterprise application host platform 160 may process and/or otherwise execute transactions on specific accounts based on commands and/or other information received from other computer systems comprising the computing environment 100.

For example, the enterprise application host platform 160 may determine available funds in a user account associated with a debit card, or an available credit corresponding to a credit card (e.g., as described at step 518). Based the determining, the enterprise application host platform 160 may initiate a card-based payment transaction (e.g., fund transfer to a recipient account), or send a notification to one or more platforms in the computing environment 100 indicating that the transaction may be approved.

The enterprise user computing device(s) 120 and/or the user device(s) 110 may be personal computing devices (e.g., desktop computers, laptop computers) or mobile computing devices (e.g., smartphones, tablets). The enterprise user computing device(s) 120 may be linked to and/or operated by specific enterprise users (who may, for example, be employees or other affiliates of the enterprise organization).

The user device(s) 110 may be linked to and/or operated by clients associated with the banking/financial organization (e.g., who may have been issued payment cards). The user device(s) 110 may be used to request a credit/debit card transaction via a payment interface (e.g., an online payment portal). A user device 110 may be a cellphone to which an OTP may sent (e.g., by an authentication platform, payment processor platform, etc.). A user device 110 may be a smartphone that may be used to generate and transmit a security key for validation at the authentication platform 150. A user device 110 may be a smartphone that may comprise a keypad interface that may be used to input a received OTP.

The payment processor platform(s) 130 and the verification platform(s) 140 may comprise one or more computing devices and/or other computer components (e.g., processors, memories, communication interfaces). The payment processor platform(s) 130 may correspond to one or more payment processors. The verification platform(s) 140 may include a card network platform, a financial institution platform, or the like. The payment processor platform(s) 130 and the verification platform(s) 140 may be configured to host, execute, and/or otherwise provide one or more applications for enabling card-based transactions. For example, the payment processor platform(s) 130 and the verification platform(s)

140 may facilitate transmission of transaction data (e.g., transaction details, authorization responses, etc.) between payment interfaces and bank networks. A payment processor may maintain connections with multiple different card networks. The payment processor forward transaction details, associated with a payment transaction that uses a card, to a card network corresponding to the card. Additionally, the payment processor platform(s) 130 or the verification platform(s) 140 may perform one or more of the authentication steps as described herein.

In one or more arrangements, the authentication platform 150, the enterprise application host platform 160, the enterprise user computing devices 120, the user device(s) 110, the payment processor platform(s) 130, the verification platform (s) 140, and/or other devices/systems in the computing environment 100 may be any type of computing device capable of receiving input via a user interface, and communicating the received input to one or more other computing devices in the computing environment 100. For example, the authentication platform 150, the enterprise application host platform 160, the enterprise user computing devices 120, the user device(s) 110, the payment processor platform(s) 130, the verification platform(s) 140, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the authentication platform 150, the enterprise application host platform 160, the enterprise user computing devices 120, the user device(s) 110, the payment processor platform(s) 130, the verification platform(s) 140, and/or the other devices/systems in the computing environment 100 may, in some instances, be and/or comprise special-purpose computing devices configured to perform specific functions.

Figure 2:
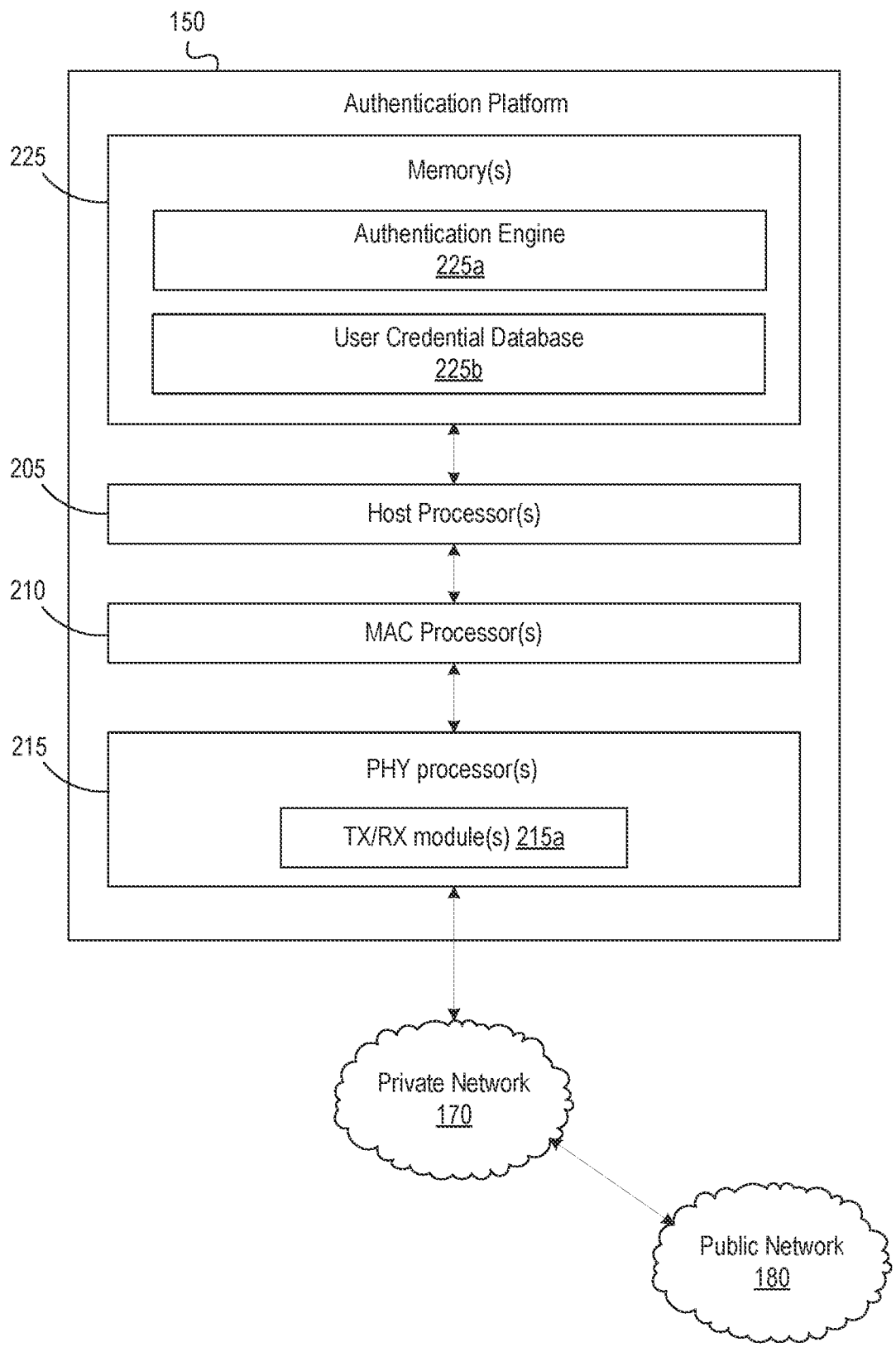
FIG. 2 shows an example computing platform, in accordance with one or more examples described herein.

FIG. 2 shows an example computing platform 150, in accordance with one or more examples described herein. Although functions and aspects are described as associated with authentication platform 150, payment processor platform 130 may include the same or similar modules, perform the same or similar functions, and/or the like. The authentication platform 150 may comprise one or more of host processor(s) 205, medium access control (MAC) processor (s) 210, physical layer (PHY) processor(s) 215, transmit/ receive (TX/RX) module(s) 215a, memory 225, and/or the like. One or more data buses may interconnect host processor(s) 205, MAC processor(s) 210, PHY processor(s) 215, and/or Tx/Rx module(s) 215a, and/or memory 225. The authentication platform 150 may be implemented using one or more integrated circuits (ICs), software, or a combination thereof, configured to operate as discussed below. The host processor(s) 205, the MAC processor(s) 210, and the PHY processor(s) 215 may be implemented, at least partially, on a single IC or multiple ICs. Memory 225 may be any memory such as a random-access memory (RAM), a read-only memory (ROM), a flash memory, or any other electronically readable memory, or the like.

Messages transmitted from and received at various devices (e.g., in the computing environment 100) may be encoded in one or more MAC data units and/or PHY data units. The MAC processor(s) 210 and/or the PHY processor (s) 215 of the authentication platform 150 may be configured to generate data units, and process received data units, that conform to any suitable wired and/or wireless communication protocol. For example, the MAC processor(s) 210 may be configured to implement MAC layer functions, and the PHY processor(s) 215 may be configured to implement PHY layer functions corresponding to the communication protocol. The MAC processor(s) 210 may, for example, generate MAC data units (e.g., MAC protocol data units (MPDUs)), and forward the MAC data units to the PHY processor(s) 215. The PHY processor(s) 215 may, for example, generate PHY data units (e.g., PHY protocol data units (PPDUs)) based on the MAC data units. The generated PHY data units may be transmitted via the TX/RX module(s) 215a over the private network 170. Similarly, the PHY processor(s) 215 may receive PHY data units from the TX/RX module(s) 215a, extract MAC data units encapsulated within the PHY data units, and forward the extracted MAC data units to the MAC processor(s). The MAC processor(s) 210 may then process the MAC data units as forwarded by the PHY processor(s) 215.

One or more processors (e.g., the host processor(s) 205, the MAC processor(s) 210, the PHY processor(s) 215, and/or the like) of the authentication platform 150 may be configured to execute machine readable instructions stored in memory 225. The memory 225 may comprise one or more program modules/engines having instructions that when executed by the one or more processors cause the authentication platform 150 to perform one or more functions described herein. The one or more program modules/engines and/or databases may be stored by and/or maintained in different memory units of the authentication platform 150 and/or by different computing devices that may form and/or otherwise make up the authentication platform 150. For example, the memory 225 may have, store, and/or comprise an authentication engine 225a and/or a user credential database 225b.

Figure 4:
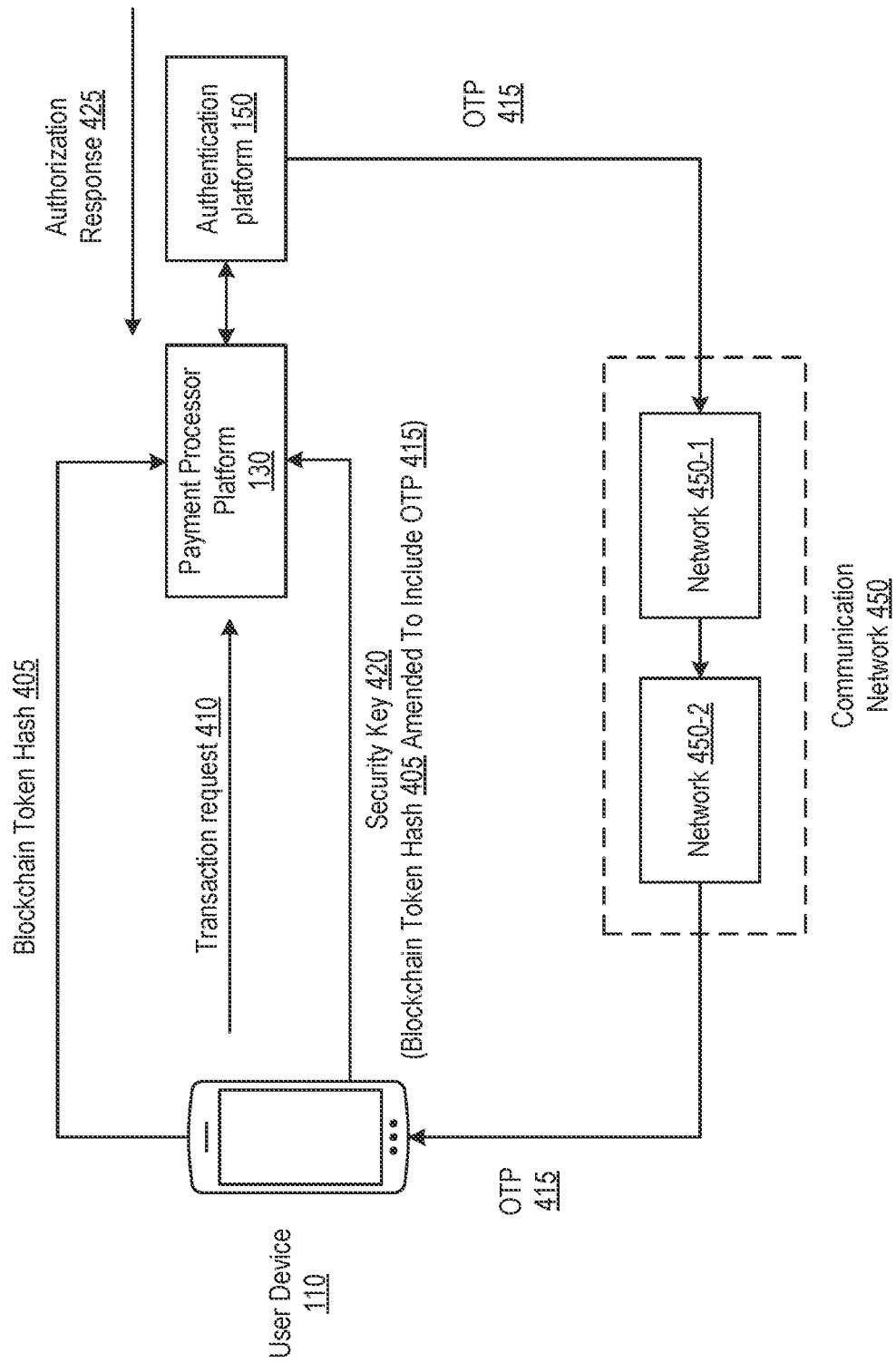
FIG. 4 shows an example procedure process for multi-factor authentication, based on an OTP and a blockchain token, of a card-based transaction, in accordance with one or more example arrangements.
Figure 5A:
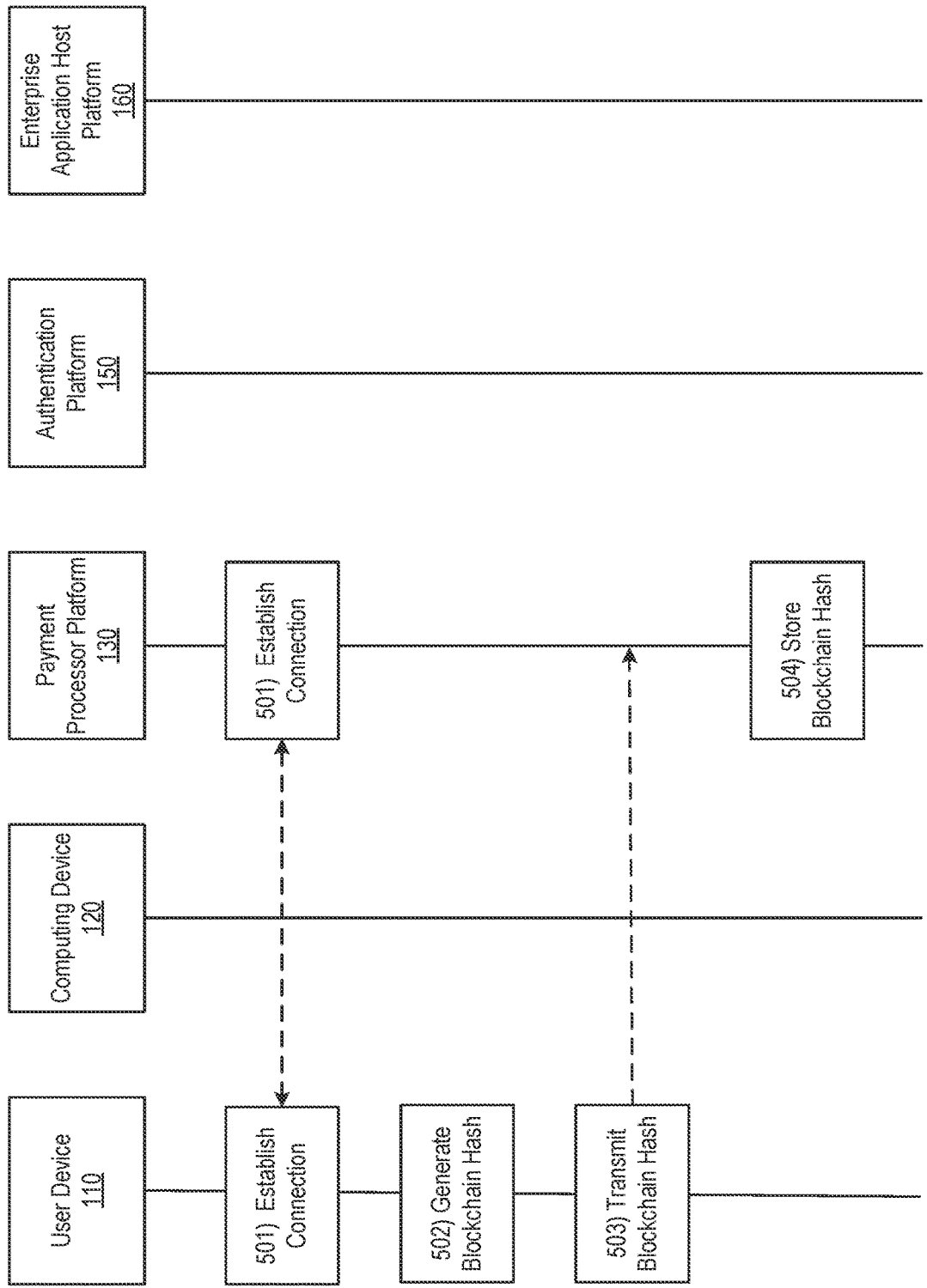
Figure 5D:
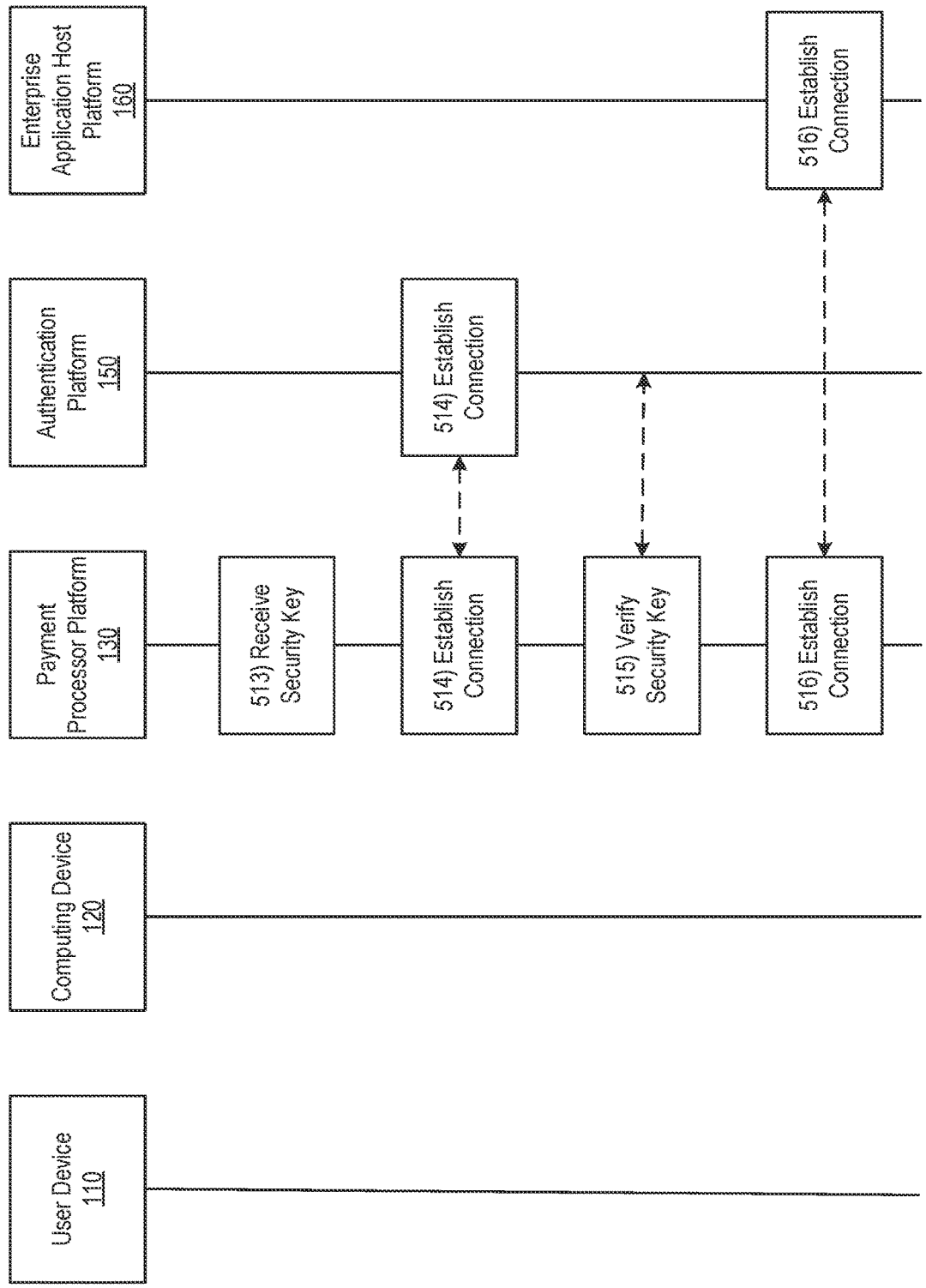
Figure 5E:
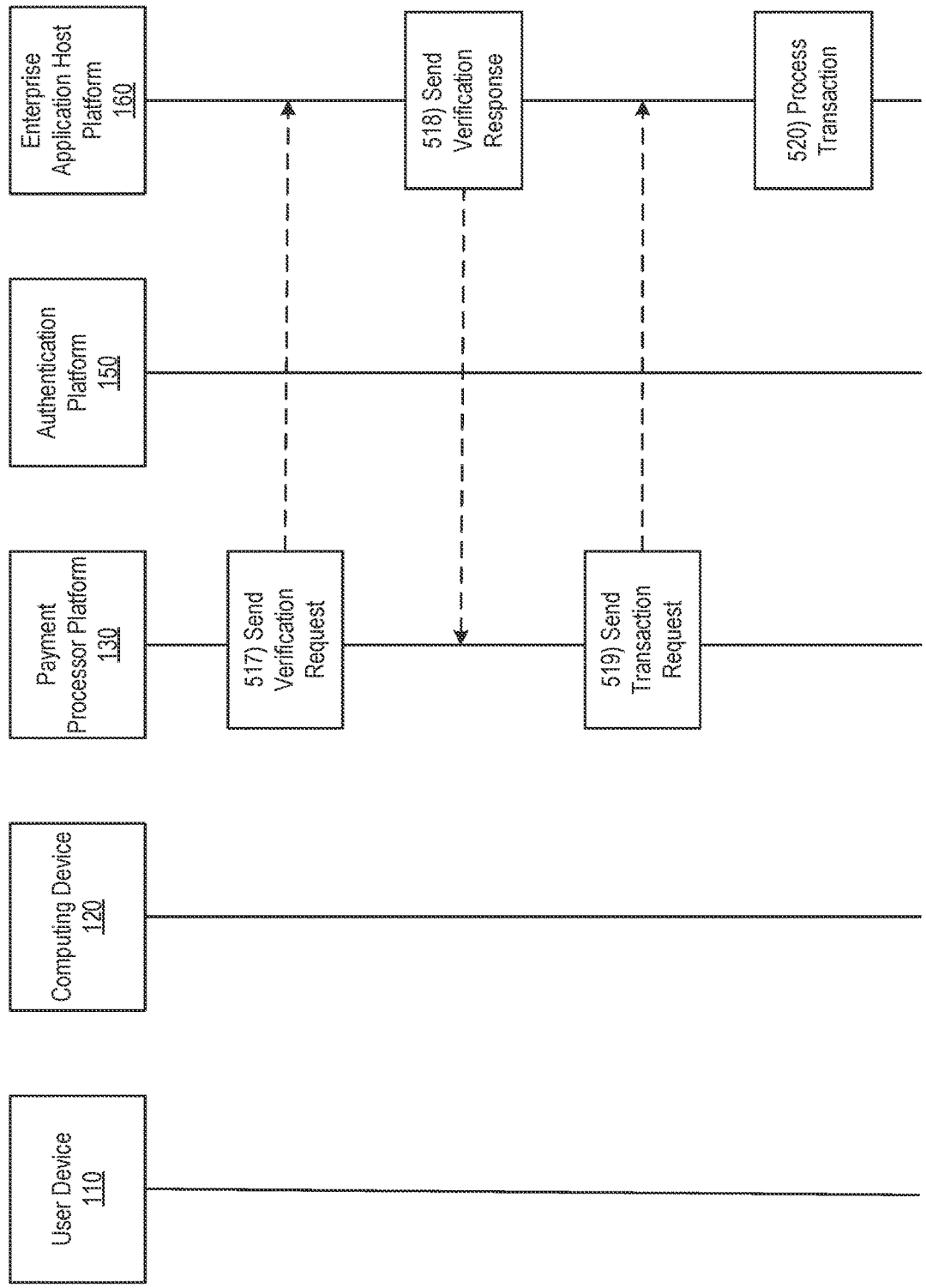
Figure 5F:
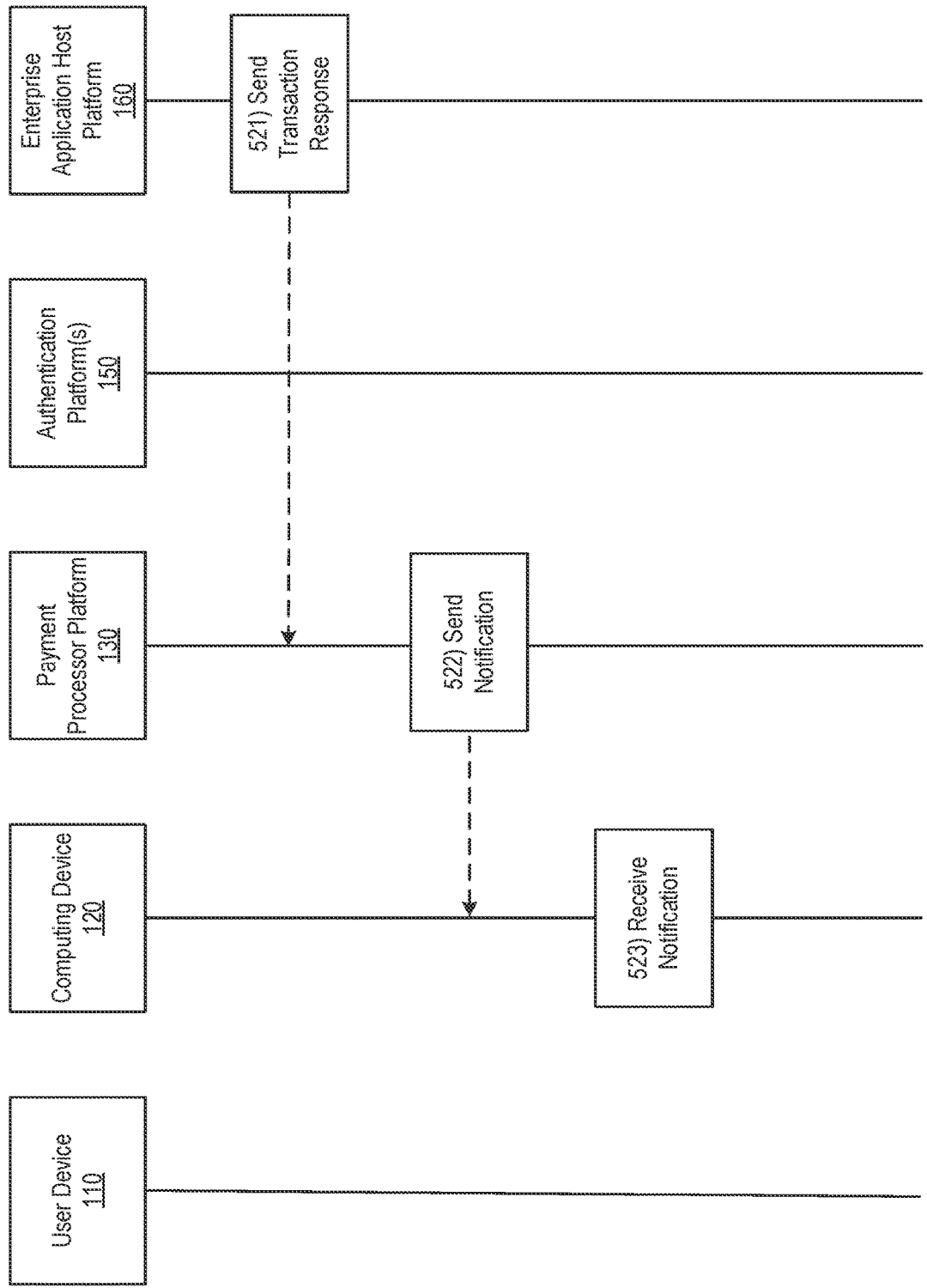
Figure 6:
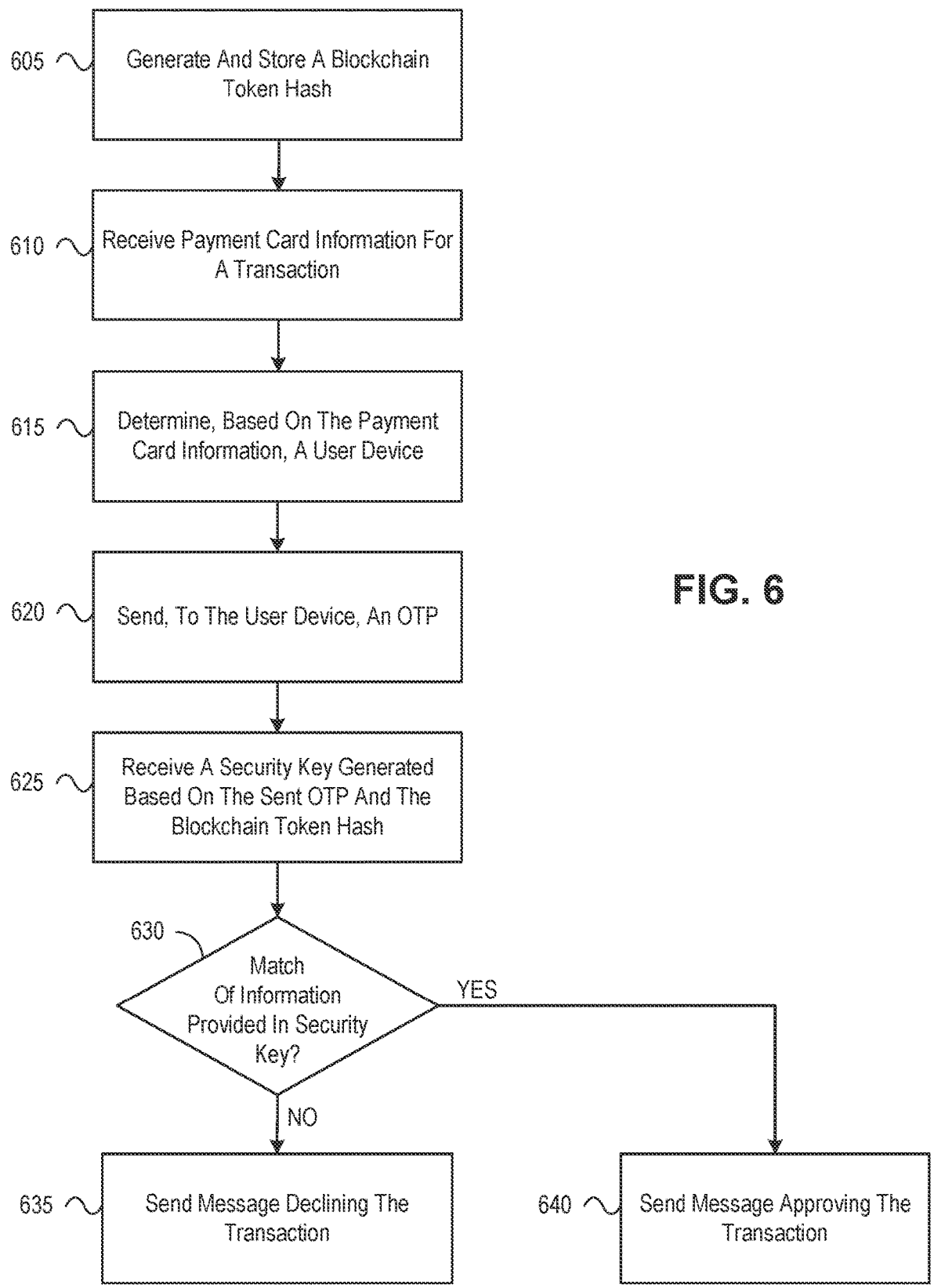
FIG. 6 shows an example process for authenticating a transaction based on a blockchain token, in accordance with one or more example arrangements.

The authentication engine 225a may have instructions that direct and/or cause the authentication platform 150 to perform one or more operations relating to transaction authentication (e.g., based one or more of an OTP, a blockchain token, a hash of a blockchain token, a security key, etc., as described with respect to FIGS. 4-6). The user credential database 225b may comprise user credentials, associated with a plurality of users corresponding to the issuing bank or a payment processor, that may be used for various steps corresponding to authenticating a transaction. For example, the user credential database 225b may store a cell phone number associated with a user (e.g., for sending an OTP), an OTP as sent to a user device, etc. The various credentials corresponding to a user may be associated, in the user credential database 225b, with a card number of a payment card of the user. In this manner, when transaction details (e.g., comprising a card number) for a user transaction are received at the authentication platform 150, the computing platform may send an OTP to a user device based on retrieving a cell phone number, and further validate a received security key.

While FIG. 1 illustrates the authentication platform 150, the enterprise application host platform 160, and the enterprise user computing devices 120, as being separate elements connected in the private network 170, in one or more other arrangements, functions of one or more of the above may be integrated in a single device/network of devices. For example, elements in the authentication platform 150 (e.g., host processor(s) 205, memory(s) 225, MAC processor(s) 210, PHY processor(s) 215, TX/RX module(s) 215a, and/or one or more program/modules stored in memory(s) 225) may share hardware and software elements with and corresponding to, for example, the enterprise application host platform 160 and/or the enterprise user computing devices 120.

Figure 3:
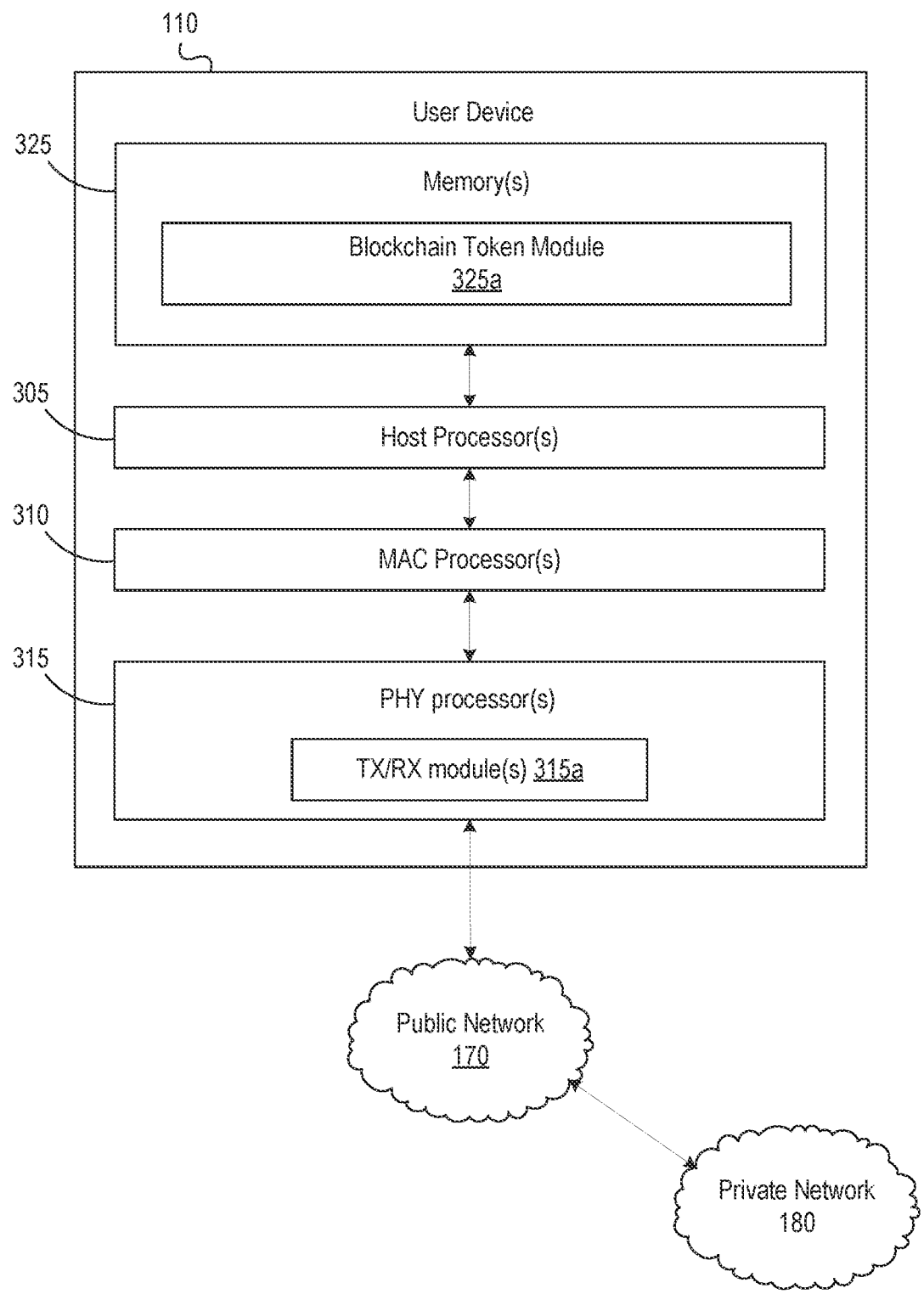
FIG. 3 shows an example user device, in accordance with one or more examples described herein.

FIG. 3 shows an example user device 110, in accordance with one or more examples described herein. The user device 110 may correspond to a device that may be used for multi-factor authentication as described herein. The user device 110 may comprise one or more of host processor(s) 305, medium access control (MAC) processor(s) 310, physical layer (PHY) processor(s) 315, transmit/receive (TX/RX) module(s) 315a, memory 325, and/or the like. One or more data buses may interconnect host processor(s) 305, MAC processor(s) 310, PHY processor(s) 315, and/or Tx/Rx module(s) 315a, and/or memory 325. The user device 110 may be implemented using one or more integrated circuits (ICs), software, or a combination thereof, configured to operate as discussed below. The host processor(s) 305, the MAC processor(s) 310, and the PHY processor(s) 315 may be implemented, at least partially, on a single IC or multiple ICs. Memory 325 may be any memory such as a random-access memory (RAM), a read-only memory (ROM), a flash memory, or any other electronically readable memory, or the like.

Messages transmitted from and received at various devices (e.g., in the computing environment 100) may be encoded in one or more MAC data units and/or PHY data units. The MAC processor(s) 310 and/or the PHY processor (s) 315 of the user device 110 may be configured to generate data units, and process received data units, that conform to any suitable wired and/or wireless communication protocol. For example, the MAC processor(s) 310 may be configured to implement MAC layer functions, and the PHY processor (s) 315 may be configured to implement PHY layer functions corresponding to the communication protocol. The MAC processor(s) 310 may, for example, generate MAC data units (e.g., MAC protocol data units (MPDUs)), and forward the MAC data units to the PHY processor(s) 315. The PHY processor(s) 315 may, for example, generate PHY data units (e.g., PHY protocol data units (PPDUs)) based on the MAC data units. The generated PHY data units may be transmitted via the TX/RX module(s) 315a over the private network 180. Similarly, the PHY processor(s) 315 may receive PHY data units from the TX/RX module(s) 315a, extract MAC data units encapsulated within the PHY data units, and forward the extracted MAC data units to the MAC processor(s). The MAC processor(s) 310 may then process the MAC data units as forwarded by the PHY processor(s) 315.

One or more processors (e.g., the host processor(s) 305, the MAC processor(s) 310, the PHY processor(s) 315, and/or the like) of the user device 110 may be configured to execute machine readable instructions stored in memory 325. The memory 325 may comprise one or more program modules/engines having instructions that when executed by the one or more processors cause the user device 110 to perform one or more functions described herein. The one or more program modules/engines and/or databases may be stored by and/or maintained in different memory units of the user device 110 and/or by different computing devices that may form and/or otherwise make up the user device 110. For example, the memory 325 may have, store, and/or comprise a blockchain token module 325a.

The blockchain token module 325a may have instructions that direct and/or cause the user device 110 to generate a blockchain token hash (e.g., based on user information, device information, and/or card information). In addition, the blockchain token module 325a may have instructions that direct and/or cause the user device 110 to generate a security key (e.g., based on a received OTP and the blockchain token hash). The blockchain token module 325a may further cause the user device to send the security key for validation at an authentication platform.

FIG. 4 shows an example system for implementing a process for an augmented multi-factor authentication, based on an OTP and a blockchain token, of a card-based transaction, beginning with a registration process of generating a blockchain token associated with an authorized user. A user device 110 (e.g., a smartphone), corresponding to the authorized user, may comprise a mobile application executing thereon (e.g., a credit card provider application, a financial institution application, or the like). In an arrangement, the mobile application (or a link to download and install the mobile application) may be provided to the user when the user executes a triggering event (e.g., is issued a payment card (e.g., credit/debit card) by an issuing bank, opens an account, or the like). The mobile application may generate a blockchain token and its hash corresponding to the user. The hash may be generated based on user information (e.g., card number, user name, card account number, bank account number, etc.), device information (e.g., mobile device identifier), and/or card information (e.g., credit card number).

The mobile application installed on user device 110 may encrypt and send the blockchain token hash 405 to a payment processing gateway (e.g., payment processor platform 130 that may be in communication with or include a card network platform, a financial institution platform, or the like). For example, the blockchain token and its hash may be encrypted and sent to payment processing platform 130 for registration on a blockchain network of a credit card provider system. In some examples, the payment processor platform 130 may be in communication with more than one credit card provider systems or platforms (e.g., corresponding to different credit card companies or banks/financial institutions). In some examples, the user device 110 may distribute the blockchain token hash 405 (and the associated user information) for storage in corresponding blockchain networks of the payment processor platform 130 and other platforms. Each of the platforms may correspond to "nodes" that may be used to validate a future received blockchain token hash 405 for validating a transaction, as further described herein.

Following the registration process, a user may initiate/request a card-based transaction (e.g., credit card/debit card payment to a merchant). For example, the user device 110 may be used to request a card-based transaction via a payment interface (e.g., an online payment portal). The payment interface 304 may receive at least some of transaction details for the card-based transaction. The transaction details may include one or more of: a card number, CVV number, user name, expiration date, transaction amount, a recipient account number, recipient bank, merchant identifier (ID), merchant category code (MCC), etc. The payment interface may comprise a payment portal provided via a web page associated with an online merchant, and provided on a computing device requesting the transaction. In another example, the payment interface may comprise a card reader device (e.g., at a brick and mortar store) that may be used to scan/read the card and determine at least some of the transaction details.

The payment interface may encrypt and send the transaction details (e.g., as part of a transaction request 410) to a network associated with an issuing bank/financial institution of the card. The transaction details may be forwarded by payment processor platform 130 that facilitates communication between the payment interface and the network associated with the issuing bank. The payment processor platform 130 may comprise one or more platforms that function as/correspond to a payment gateway, payment processor, card network infrastructure, etc., that perform various functions associated with processing a card-based transaction.

For example, the payment interface may send the transaction details to an authentication platform 150 associated with the issuing bank. The network associated with the issuing bank may comprise one or more other platforms/servers to review the transaction details to confirm that the transaction details are valid (e.g., valid card number, user name, expiration date, etc.). The authentication platform 150 may determine a user associated with the card based on the transaction details (e.g., the card number). The authentication platform 150 may determine a user device 110 (e.g., cell phone number) associated with the user based on the transaction details. Following this, the authentication platform 150 may send a message (e.g., an SMS message), via a communication network 450 (e.g., a cellular network) to the user device 110, wherein the message may comprise a randomly-generated, single-use OTP 415. In an arrangement, the user device 110 may be the same as the computing device processing or requesting processing of the transaction. In an arrangement, the user device 110 may be different from the computing device processing or requesting processing of the transaction.

A security key 420 may be determined and generated based on the sent OTP 415. For example, the user device 110 may generate the security key 420 by amending the blockchain token hash (e.g., stored during the registration process and retrieved from one or more nodes associated with a plurality of card networks) to include the sent OTP 415. The blockchain token and its hash may be generated, for example, when the user registers a credit card (e.g., via a credit card application) on their mobile communication device. The blockchain token hash may comprise a string of numeric or alphanumeric characters.

The security key 420 may be determined using the blockchain token hash and the OTP 415, and further based on based on one or more predefined rules set by a payment gateway device. In some examples, the one or more predefined rules may be set by the payment gateway device at the time of a transaction. Consider an example where the blockchain token hash is $H_1H_2H_3H_4H_5H_6H_7H_8H_9$, and the OTP 415 is $O_1O_2O_3O_4O_5O_6$. The one or more predefined rules may indicate the manner in which the characters/numbers of the blockchain token hash and the OTP 415 are to be placed for generating the security key 420.

The one or more predefined rules may indicate that the blockchain token hash and the OTP are to be interleaved as per a specific pattern to generate the security key 420. For example, the one or more predefined rules may indicate that the security key 420 may be generated as $H_1H_2H_3H_4H_5H_6O_1O_2O_3O_4O_5O_6H_7H_8H_9$. As another example, the one or more predefined rules may indicate that the security key 420 may be generated as $H_1H_2O_1O_2H_3H_4H_5H_6O_3O_4O_5H_7H_8H_9O_6$.

The one or more predefined rules may indicate that the security key 420 may be generated by appending the blockchain token hash to (e.g., add on to the end of) the OTP 415. For example, the one or more predefined rules may indicate that the security key 420 may be generated as $O_1O_2O_3O_4O_5O_6H_1H_2H_3H_4H_5H_6H_7H_8H_9$.

The one or more predefined rules may indicate that the security key 420 may be generated by prepending the blockchain token hash to (e.g., add on to the beginning of) the OTP 415. For example, the one or more predefined rules may indicate that the security key 420 may be generated as $H_1H_2H_3H_4H_5H_6H_7H_8H_9O_1O_2O_3O_4O_5O_6$.

The above are merely illustrations and any other predefined rule or code patterns may be used for generating the security key 420 based on the blockchain token hash and the sent OTP 415. The payment gateway device may set the one or more predefined rules, for example, when the user sets up their card account. Additionally or alternatively, in at least some examples, the blockchain token hash may be amended to include the OTP in a random position.

The user device 110 may encrypt and send the security key 420 to the payment processor platform 130 (e.g., payment processing gateway). The payment processor platform 130 may forward the security key 420 to the authentication platform 150 (e.g., via Internet, using hypertext transfer protocol (HTTP), or other communication channel 1). The OTP 415 may be time-sensitive, and the authentication platform 150 may expect to receive the security key 420 within a predetermined time period following the sending of the OTP 415 to the user device 110.

The authentication platform 112 may decrypt the received security key 420 and extract the OTP and the blockchain token hash from the security key. In some examples, only when both the OTP and the blockchain token hash provided in the security key are successfully verified, the transaction may be authorized. For example, based on the OTP provided in the security key 420 matching the sent OTP and the blockchain token hash provided in the security key matching a blockchain token hash stored at a predetermined number of nodes associated with a plurality of card networks, the authentication platform 150 may approve the transaction. Based on the OTP provided in the security key 420 not matching the sent OTP or the blockchain token hash provided in the security key not matching a blockchain token hash, corresponding to the user, stored at a predetermined number of nodes associated with a plurality of card networks (or the security key 420 not being received within the predetermined time period), the authentication platform 150 may decline the transaction. Approving or declining the transaction may further be based on determining whether an account associated with the user has sufficient balance or credit for the transaction. For example, the authentication platform 150 may communicate with one or more other servers/platforms within the bank network to determine account details associated with the card and determine whether the account associated with the card has sufficient balance or credit for the transaction. Based on approving the transaction, the authentication platform 150 may send an indication to one or more other servers/platforms within the bank network to initiate processing of the transaction.

The authentication platform 150 may send an authorization response 425 to the payment interface, via payment processor platform 130. The authorization response 425 may indicate whether the transaction is approved or declined. The payment interface may indicate whether the transaction is approved or declined based on the authorization response 425.

The procedure described with reference to FIG. 4 may be integrated with existing card-based payment infrastructure. For example, existing protocols and messages associated with standard two-factor authentication (e.g., sending an OTP and receiving a user response) do not need to be modified. The OTP may be sent via an SMS which may ensure that the procedures may function even in scenarios with basic cellular infrastructure (e.g., no internet connectivity).

Accordingly, by relying on the security key including both the blockchain hash and OTP to authorize a transaction, even if a malicious actor is able to divert an OTP, the malicious actor would not be able to gain knowledge of the blockchain token and/or its hash (e.g., via social engineering/phishing) to process the transaction. Since a user's blockchain token hash is stored in, for example a payment processing gateway that may be in communication with or include the backend of a credit card company's mobile application, without having full physical control over a user's device, the malicious actor would not be able to authenticate the transaction. It would be difficult for the malicious actor to authenticate themselves short of compromising the communication network, the payment processing gateway, and the whole blockchain network of the credit card company, in addition to knowing the user's credit card details (e.g., credit card number). The authentication platform may block any transactions associated with the card if a number of failed transactions exceeds a threshold. As such, the blockchain token based authentication mechanism described herein has multiple additional layers of security over standard two-factor OTP traditionally used for payment authentication.

FIGS. 5A-5F show an example event sequence for multi-factor authentication of a card-based transaction in accordance with one or more arrangements described herein. As discussed herein, the multi-factor authentication may use a blockchain token hash associated with authorized user information, device information, and/or card information amended to include a generated OTP to authorize the transaction. A user may input at least some of transaction details for the card-based transaction (e.g., credit card/debit card payment transaction) via a payment interface. The transaction details may comprise/indicate one or more of a card number, CVV number, user name, expiration date, transaction amount, recipient account number, recipient bank ID, etc. The payment interface may correspond to a payment portal provided via a web page associated with an online merchant, and provided on a computing device 120 requesting processing of the transaction. In another example, the computing device 120 may correspond to a card reader device (e.g., at a brick and mortar store) that may be used to scan/read the card and determine at least a portion of the transaction details.

Referring to FIG. 5A, at step 501, user device 110 may connect to (e.g., establish a connection with) payment processor platform 130. For example, user device 110 may establish a first wireless data connection with payment processor platform 130 to link user device 110 with payment processor platform 130. In some instances, user device 110 may identify whether or not a connection is already established with payment processor platform 130. If a connection is already established with payment processor platform 130, user device 110 might not re-establish the connection. If a connection is not yet established with payment processor platform 130, user device 110 may establish the first wireless data connection as described above.

A registration process may be performed, for example, at steps 502 through 504. At step 502, user device 110 may generate a blockchain hash (e.g., based on user information, device information, and/or card information). At step 503, user device 110 may transmit (e.g., while the first wireless data connection is established) the blockchain hash to a payment processor (e.g., payment processor platform 130). In turn, at step 504, payment processor platform 130 may store the blockchain hash. In some examples, the blockchain hash may be stored in a payment processing gateway that may be in communication with or include the backend of a credit card company's mobile application. In some examples, the registration may be performed via an application executing on the user device (e.g., user device 110).

Referring to FIG. 5B, at step 505, computing device 120 may connect to (e.g., establish a connection with) payment processor platform 130. For example, computing device 120 may establish a second wireless data connection with payment processor platform 130 to link computing device 120 with payment processor platform 130. In some instances, computing device 120 may identify whether or not a connection is already established with payment processor platform 130. If a connection is already established with payment processor platform 130, computing device 120 might not re-establish the connection. If a connection is not yet established with payment processor platform 130, computing device 120 may establish the second wireless data connection as described above.

At step 506, a payment processor platform 130 may receive, from the computing device 120 (e.g., while the second wireless data connection is established), the transaction details. In an arrangement, the payment processor platform 130 may receive the transaction details from the computing device via a payment gateway.

At step 507, the payment processor platform 130 may determine or identify a user device 110 associated with the user based on the transaction details. The user device 110 may be a smartphone and determining or identifying the user device 110 may comprise determining a cell phone number corresponding to the user device 110 (e.g., based on data provided via, for instance, a registration process and stored in association with user identifying data).

Following this, the payment processor platform 130 may send, at step 508 (e.g., while the first wireless data connection is established), a message (e.g., an SMS message), via a communication network (e.g., a cellular network) to the user device 110, wherein the message may comprise a randomly-generated, single-use OTP. In an arrangement, the user device 110 may be the same as the computing device 120 requesting the transaction. In an arrangement, the user device 110 may be different from the computing device 120 requesting the transaction.

Referring to FIG. 5C, at step 509, the user may input the OTP at the user device 110. At step 510, user device 110 may retrieve (e.g., while the first wireless data connection is established), the stored blockchain hash (e.g., from payment processor platform 130). At step 511, the user device 110 may generate a security key based on the OTP and a blockchain token hash associated with the user and stored by, for instance, the payment processor platform 130 in communication with or including the credit card back end and/or the user device 110. At step 512, the user device 110 may encrypt and send (e.g., while the first wireless data connection is established) the security key to the payment processor platform 130 which may, in some examples, be associated with the card network. The OTP may be time-sensitive, and the payment processor platform 130 may expect to receive the security key within a predetermined time period following the sending of the OTP to the user device 110.

Referring to FIG. 5D, at step 513, payment processor platform 130 may receive the encrypted security key sent by the user device 502. At step 514, payment processor platform 130 may connect to (e.g., establish a connection with) authentication platform 150. For example, payment processor platform 130 may establish a third wireless data connection with authentication platform 150 to link payment processor platform 130 with authentication platform 150. In some instances, payment processor platform 130 may identify whether or not a connection is already established with authentication platform 150. If a connection is already established with authentication platform 150, payment processor platform 130 might not re-establish the connection. If a connection is not yet established with authentication platform 150, payment processor platform 130 may establish the third wireless data connection as described above.

At step 515, the payment processor platform 130 may verify (e.g., while the third wireless data connection is established) the security key as received from the user device 110. Verifying the security key may comprise payment processor platform 130 decrypting the security key, extracting the OTP from the security key, comparing the extracted OTP with the OTP sent by the payment processor platform 130 (e.g., at step 508), and verifying the blockchain token with the blockchain node stored at the payment processor platform 130 in communication with or including the credit card back end. The payment processor platform 130 may determine that the user is authenticated based on the OTP provided in the security key matching the sent OTP and the blockchain token hash provided in the security key matching a blockchain token hash stored at a predetermined number of nodes associated with a plurality of card networks. The payment processor platform 130 may determine that the user is not authenticated based on the OTP provided in the security key not matching the sent OTP, or the blockchain token hash provided in the security key not matching a blockchain token hash, corresponding to the user, stored at a predetermined number of nodes associated with a plurality of card networks. In an example, verifying the received blockchain token hash may comprise comparing the received blockchain token hash with a respective blockchain token hash, corresponding to the user, as stored in one or more nodes and retrieved from one or more nodes. The one or more nodes may correspond to different verification platforms 140 (e.g., corresponding to different card networks/card association infrastructures) and/or authentication platforms (e.g., authentication platform 150) associated with multiple different banking/financial institutions. The payment processor platform 130 may send the received blockchain token hash to the one or more nodes. The one or more nodes may compare the received blockchain token hash with respective stored blockchain token hash corresponding to the user. The one or more nodes may send notification(s) to the payment processor platform 130 indicating whether the received blockchain token hash matches the respective stored blockchain token hash corresponding to the user. The payment processor platform 130 may determine that the user is authenticated based on a predetermined number of nodes (e.g., one or more nodes, a majority of the nodes, or the like) indicating that the blockchain token hash matches respective stored blockchain token hashes corresponding to the user. The payment processor platform 130 may determine that the user is not authenticated based on determining that the predetermined number of nodes indicate that the received blockchain token hash does not match respective stored blockchain token hashes corresponding to the user. Based on this determination, the payment processor platform 130 may decline the transaction.

At step 516, payment processor platform 130 may connect to (e.g., establish a connection with) authentication platform 150. For example, payment processor platform 130 may establish a fourth wireless data connection with authentication platform 150 to link payment processor platform 130 with authentication platform 150. In some instances, payment processor platform 130 may identify whether or not a connection is already established with authentication platform 150. If a connection is already established with authentication platform 150, payment processor platform 130 might not re-establish the connection. If a connection is not yet established with authentication platform 150, payment processor platform 130 may establish the fourth wireless data connection as described above.

Referring to FIG. 5E, at step 517, if the user is determined to be authenticated, the payment processor platform 130 may send (e.g., while the fourth wireless data connection is established) a verification request, to an enterprise application host platform 160 associated with a network of a bank/financial institution that issued the card. Enterprise application host platform 160 may be in communication with or include a card network platform, a financial institution platform, or the like. The verification request may comprise one or more of the transaction details. The enterprise application host platform 160 may, based on the transaction details, determine a balance associated with the banking account corresponding to the card (e.g., if the card is a debit card), or an available credit associated with the card (e.g., if the card is a credit card). The enterprise application host platform 160 may determine whether a balance associated with a banking account corresponding to the card exceeds the transaction amount (e.g., if the card is a debit card), or if an available credit associated with the card exceeds the transaction amount (e.g., if the card is a credit card).

At step 518, an enterprise application host platform 160 may send (e.g., while the fourth wireless data connection is established) a verification response to the payment processor platform 130. The verification response may indicate whether the transaction is approved. The verification response may indicate that the transaction is approved if a balance associated with a banking account corresponding to the card exceeds the transaction amount, or if an available credit associated with the card exceeds the transaction amount. The verification response may indicate that the transaction is declined if a balance associated with a banking account corresponding to the card exceeds the transaction amount, or if an available credit associated with the card exceeds the transaction amount.

At step 519, and based on the verification response indicating that the transaction is approved, the payment processor platform 130 may send (e.g., while the fourth wireless data connection is established) a transaction request to the enterprise application host platform 160. The transaction request may comprise the transaction details (e.g., one or more of a card number, CVV number, user name, expiration date, transaction amount, recipient account number, recipient bank). At step 520, the enterprise application host platform 160 may process the transaction. For example, the enterprise application host platform 160 may initiate a fund transfer from an account associated with the card to the recipient account. Referring to FIG. 5F, at step 521, the enterprise application host platform 160 may send, to the payment processor platform 130 (e.g., while the fourth wireless data connection is established), a transaction response indicating that the transaction has been processed.

At step 522, the payment processor platform 130 may send (e.g., while the second wireless data connection is established) a notification to the computing device 120. In turn, at step 523, computing device 120 may receive the notification from payment processor platform 130. The notification may indicate that the transaction has been processed, for example, if the payment processor platform receives the transaction response indicating that the transaction has been processed. The notification may indicate that the transaction has been declined, for example, based on at least one of (i) the received OTP not matching the sent OTP, (ii) the received blockchain token hash not matching the stored blockchain token hash (e.g., at step 515), or (iii) the verification response indicating that the transaction has been declined (e.g., at step 516).

While FIGS. 5A-5F shows various steps being performed at a payment processor platform, in other embodiments, other platforms in the network (e.g., an authentication platform associated with a bank) may be used to perform one or more of the functions described herein.

The event sequence of FIGS. 5A-5F may ensure that even if an OTP is diverted/compromised, card-based transactions may be secure due to the added additional layer of authentication provided by generated security key that includes both the blockchain token hash and the OTP. Further, the blockchain token may be securely stored on the blockchain at the verification platform and/or the user device and just the encrypted security key including, for example, an encrypted blockchain token's hash and amended OTP, is transmitted. In some examples, the use of multiple nodes for authenticating the blockchain token hash may ensure that even if a single node in the network is compromised, the authentication mechanism is not affected (e.g., because a predetermined number of the nodes need to authenticate the blockchain token hash).

FIG. 6 shows an example process for multi-factor authentication for processing a card-based transaction. At step 605, a computing platform may generate and store a blockchain token hash. At step 610, the computing platform may receive card information for a transaction associated with a user (e.g., card number of the user, user name, expiration date, CVV number, etc.). The card information may be indicated in transaction details as input (e.g., by a user and/or at a merchant) via a payment interface at a computing device (e.g., as described with respect to FIG. 4).

At step 615, the computing platform may determine or identify a user device based on the card information. For example, the computing platform may determine or identify a mobile device phone number, associated with the user device, corresponding to a card number included in the card information. The card number (or any other card information) may be associated with the mobile device phone number and may be stored in a user credential database at the computing platform (e.g., during a registration process). The computing platform may query the user credential database to retrieve the mobile device phone number corresponding to the card information.

At step 620, the computing platform may send, to the user device, an OTP. The OTP may be randomly generated. The OTP may be sent to the user device via an SMS addressed to the mobile device phone number corresponding to the user device. In turn, the user device may generate a security key based on the sent OTP and a blockchain token hash. In some examples, the blockchain token hash may be generated based on information associated with the user, the user device, and/or the payment card. At step 625, the computing platform may receive the security key.

At step 630, the computing platform may determine if there is a match of information provided in the security key. For instance, if the OTP provided in the security key matches the sent OTP and the blockchain token hash provided in the security key matches a blockchain token hash (e.g., corresponding to the user) stored at at least a predetermined number of nodes (e.g., at least one node, at a majority of nodes associated with a plurality of card networks, or the like), the computing platform may send a message (e.g., an authorization response) (step 640) approving the transaction. If the OTP provided in the security key does not match the sent OTP, or the blockchain token hash provided in the security key does not match a blockchain token hash (e.g., corresponding to the user) stored at at least the predetermined number of nodes, the computing platform may send a message (e.g., an authorization response) (step 635) declining the transaction. The computing platform may further approve/decline a transaction based on available funds/credit in an account associated with the card. The computing platform, based on approving the transaction may send one or more indications to one or more other platforms in a network associated with the card-issuing bank. The one or more indications may signal that the transaction may be processed from a source account (e.g., associated with the user/card) to the recipient account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   one or more processors;
   a communication interface communicatively coupled to the one or more processors; and
   memory storing computer-readable instructions that, when executed by the one or more processors, cause the computing platform to:
   receive, from a user device associated with a user, a blockchain token hash;
   receive, from a computing device, transaction details associated with a card-based payment transaction corresponding to the user, wherein the transaction details comprise a card number of a payment card;
   determine, based on the card number, the user device associated with the user;
   send, to the user device, a one-time passcode (OTP);
   after sending the OTP, receive a security key including the OTP and blockchain token hash and having a pattern placing characters of the OTP and the blockchain token hash based on one or more predefined rules identifying the pattern and set at a time of the card-based payment transaction associated with the transaction details, wherein the security key is generated by the user device associated with the user;
   extract, from the security key, the OTP and blockchain token hash;
   validate the extracted OTP and blockchain token hash; and
   based on validating both the extracted OTP and the blockchain token hash, send, to the computing device, a message indicating whether the card-based payment transaction associated with the transaction details is approved or declined.

2. The computing platform of claim 1, wherein the blockchain token hash is generated based on information associated with: the user, the user device, and the payment card.

3. The computing platform of claim 1, wherein the one or more rules are set by a payment gateway device.

4. The computing platform of claim 3, wherein the pattern placing the characters of the OTP and blockchain token hash to generate the security key includes interleaving the OTP and the blockchain token hash.

5. The computing platform of claim 1, wherein the placing the characters of the OTP and blockchain token hash to generate the security key includes appending the blockchain token hash to the OTP.

6. The computing platform of claim 1, wherein the pattern placing the characters of the OTP and blockchain token hash to generate the security key includes prepending the blockchain token hash to the OTP.

7. The computing platform of claim 1, wherein the message indicates that the transaction is approved based on:
   the OTP provided in the security key matching the sent OTP, and
   the blockchain token hash provided in the security key matching a blockchain token hash, corresponding to the user, stored at a predetermined number of nodes associated with a plurality of card networks.

8. The computing platform of claim 1, wherein the message indicates that the transaction is declined based on one or more of:
   the OTP provided in the security key not matching the sent OTP; or
   the blockchain token hash provided in the security key not matching a blockchain token hash, corresponding to the user, stored at a predetermined number of nodes associated with a plurality of card networks.

9. The computing platform of claim 1, wherein the payment card is a credit card or a debit card.

10. The computing platform of claim 1, wherein the user device is a mobile communication device.

11. The computing platform of claim 1, wherein receiving the security key comprises receiving the security key via the user device.

12. A method comprising:
    receiving, from a user device associated with a user, a blockchain token hash;
    receiving, from a computing device, transaction details associated with a card-based payment transaction corresponding to the user, wherein the transaction details comprise a card number of a payment card;
    determining, based on the card number, the user device associated with the user;
    sending, to the user device, a one-time passcode (OTP);
    after sending the OTP, receiving a security key including the OTP and blockchain token hash and having a pattern placing characters of the OTP and the blockchain token hash based on one or more predefined rules identifying the pattern and set at a time of the card-based payment transaction associated with the transaction details, wherein the security key is generated by the user device associated with the user;
    extract, from the security key, the OTP and blockchain token hash;
    validate the extracted OTP and blockchain token hash; and
    based on validating both the extracted OTP and the blockchain token hash, sending, to the computing device, a message indicating whether the card-based payment transaction associated with the transaction details is approved or declined.

13. The method of claim 12, wherein the blockchain token hash is generated based on information associated with: the user, the user device, and the payment card.

14. The method of claim 12, wherein the one or more rules are set by a payment gateway device.

15. The method of claim 14, wherein the pattern placing the characters of the OTP and blockchain token hash to generate the security key includes interleaving the OTP and the blockchain token hash.

16. The method of claim 12, wherein the pattern placing the characters of the OTP and blockchain token hash to generate the security key includes appending the blockchain token hash to the OTP.

17. The method of claim 12, wherein the pattern placing the characters of the OTP and blockchain token hash to generate the security key includes prepending the blockchain token hash to the OTP.

18. The method of claim 12, wherein the message indicates that the transaction is approved based on:
the OTP provided in the security key matching the sent OTP, and
the blockchain token hash provided in the security key matching a blockchain token hash, corresponding to the user, stored at a predetermined number of nodes associated with a plurality of card networks.

19. The method of claim 12, wherein the message indicates that the transaction is declined based on one or more of:
the OTP provided in the security key not matching the sent OTP; or
the blockchain token hash provided in the security key not matching a blockchain token hash, corresponding to the user, stored at a predetermined number of nodes associated with a plurality of card networks.

20. One or more non-transitory computer-readable media storing instructions that, when executed by a computing platform comprising at least one processor, a communication interface, and memory, cause the computing platform to:
receive, from a user device associated with a user, a blockchain token hash;
receive, from a computing device, transaction details associated with a card-based payment transaction corresponding to the user, wherein the transaction details comprise a card number of a payment card;
determine, based on the card number, the user device associated with the user;
send, to the user device, a one-time passcode (OTP);
after sending the OTP, receive a security key including the OTP and blockchain token hash and having a pattern placing characters of the OTP and the blockchain token hash based on one or more predefined rules identifying the pattern and set at a time of the card-based payment transaction associated with the transaction details, wherein the security key is generated by the user device associated with the user;
extract, from the security key, the OTP and blockchain token hash;
validate the extracted OTP and blockchain token hash; and
based on validating both the extracted OTP and the blockchain token hash, send, to the computing device, a message indicating whether the card-based payment transaction associated with the transaction details is approved or declined.

\* \* \* \* \*